(12) United States Patent
Dull

(10) Patent No.: US 8,950,242 B1
(45) Date of Patent: Feb. 10, 2015

(54) TESTING HOSES AT INCREASED PRESSURE VESSELS

(75) Inventor: Kenneth Marvin Dull, Puyallup, WA (US)

(73) Assignee: The Boeing Company, Chicago, IL (US)

( * ) Notice: Subject to any disclaimer, the term of this patent is extended or adjusted under 35 U.S.C. 154(b) by 435 days.

(21) Appl. No.: 13/292,490

(22) Filed: Nov. 9, 2011

(51) Int. Cl.
G01M 3/02 (2006.01)
G01M 3/28 (2006.01)

(52) U.S. Cl.
USPC .............................. 73/40; 73/40.7; 73/40.5 R (58) Field of Classification Search
USPC ................. 73/49.1, 40, 40.7, 40.5 R
See application file for complete search history.

(56) References Cited

U.S. PATENT DOCUMENTS

| | | | | |
|---|---|---|---|---|
| 2,401,101 | A * | 5/1946 | Pockman | 73/45.5 |
| 2,697,935 | A | 12/1954 | Gordon | |
| 4,775,855 | A | 10/1988 | Cox | |
| 5,172,583 | A * | 12/1992 | Tallon | 73/40.7 |
| 5,303,576 | A * | 4/1994 | Erdelsky | 73/40 |
| 5,369,983 | A * | 12/1994 | Grenfell | 73/40.7 |
| 5,553,483 | A * | 9/1996 | Armentrout et al. | 73/40 |
| 5,767,391 | A * | 6/1998 | Wong | 73/40.7 |
| 5,847,574 | A * | 12/1998 | Berry et al. | 324/750.08 |
| 6,279,382 | B1 * | 8/2001 | Yatagai | 73/37 |
| 6,408,682 | B2 * | 6/2002 | Greszler | 73/40 |
| 7,587,928 | B2 * | 9/2009 | Kanematsu | 73/40.7 |
| 7,752,892 | B2 * | 7/2010 | Muller et al. | 73/49.2 |
| 2004/0149017 | A1 * | 8/2004 | Hutchinson et al. | 73/40.5 R |
| 2007/0157704 | A1 * | 7/2007 | Jenneus et al. | 73/40.7 |
| 2010/0206053 | A1 | 8/2010 | Underwood et al. | |
| 2011/0113861 | A1 * | 5/2011 | Maehira et al. | 73/40.7 |

OTHER PUBLICATIONS

"Radco Industries Offers Leak testing equipment," Radco Industries, 4 pp., accessed Oct. 21, 2011, http://www.radcoindustries.com/leak-testing.html, Published 2008.

* cited by examiner

Primary Examiner — Lisa Caputo
Assistant Examiner — Punam Roy
(74) Attorney, Agent, or Firm — Yee & Associates, P.C.

(57) ABSTRACT

A method and apparatus comprising a pressure vessel, a pressurization system connected to the pressure vessel, and a sensor system. The pressurization system may be configured to change a pressure in an interior of the pressure vessel. The sensor system may be configured to monitor a number of characteristics with respect to a fluid line in the pressure vessel while the pressurization system changes the pressure in the interior of the pressure vessel.

21 Claims, 9 Drawing Sheets

TESTING HOSES AT INCREASED PRESSURE VESSELS

BACKGROUND INFORMATION

1. Field

The present disclosure relates generally to fluid lines and, in particular, to a method and apparatus for testing fluid lines for inconsistencies.

2. Background

A fluid line may take the form of a structure having a channel configured to carry fluids. In other words, a fluid line may have a channel that allows fluids to be moved through the channel. For example, without limitation, a fluid line may take the form of a tube, a pipe, a hose, and some other suitable type of structure having a channel.

The fluid carried in a fluid line may include a liquid, a gas, or a combination of the two. For example, without limitation, the fluid carried in a fluid line may take the form of air, nitrogen, carbon dioxide, oxygen, water, an inert gas, some other suitable type of gas, some other suitable type of liquid, and a combination thereof.

A leak may be an example of one type of inconsistency that may be present in a fluid line. A leak may be a hole or an opening formed in the fluid line that may allow the fluid in the fluid line to escape the fluid line or may allow matter located outside of the fluid line to enter the fluid line.

Leaks may cause a system in which the fluid line is used to operate outside of selected tolerances. For example, without limitation, a fluid line may be a vacuum hose configured for use in an autoclave. When a leak is present in the vacuum hose, conditions in the autoclave may be affected.

Testing a fluid line, such as a vacuum hose, prior to use of the fluid line in a system, such as an autoclave, may be desirable. However, testing fluid lines for leaks using currently available methods may be more time-consuming and expensive than desired.

Therefore, it would be advantageous to have a method and apparatus that takes into account at least some of the issues discussed above, as well as possibly other issues.

SUMMARY

In one advantageous embodiment, an apparatus may comprise a pressure vessel, a pressurization system connected to the pressure vessel, and a sensor system. The pressurization system may be configured to change a pressure in an interior of the pressure vessel. The sensor system may be configured to monitor a number of characteristics with respect to a fluid line in the pressure vessel while the pressurization system changes the pressure in the interior of the pressure vessel.

In another advantageous embodiment, a method for testing a fluid line for inconsistencies may be provided. A fluid line may be placed in an interior of a pressure vessel. At least one end of the fluid line may be sealed. A pressure in the interior of the pressure vessel may be changed with the fluid line in the interior of the pressure vessel. A number of characteristics with respect to the fluid line may be monitored while the pressure is changed.

In yet another advantageous embodiment, an apparatus may comprise a pressure vessel, a pressurization system, and a sensor system. The pressure vessel may be configured to hold a fluid line. The pressurization system may be connected to the fluid line and configured to change a pressure inside the fluid line in the pressure vessel. The sensor system may be configured to monitor a number of characteristics with respect to an interior of the pressure vessel while the pressurization system changes the pressure inside the fluid line.

In still yet another advantageous embodiment, a method for testing a fluid line for inconsistencies is provided. The fluid line may be placed in an interior of a pressure vessel. At least one end of the fluid line may be sealed. A pressure inside the fluid line may be changed with the fluid line in the interior of the pressure vessel. A number of characteristics with respect to the interior of the pressure vessel may be monitored while the pressure inside the fluid line is changed.

In another advantageous embodiment, an apparatus may comprise a pressure vessel, a pressurization system, and a sensor system. The pressure vessel may be configured to hold a fluid line. The pressurization system may be connected to the pressure vessel and configured to change a pressure in an interior of the pressure vessel with the fluid line in the interior of the pressure vessel. The sensor system may be configured to monitor the pressure in the interior of the pressure vessel while the fluid line is allowed to vent into an environment outside of the pressure vessel.

In yet another advantageous embodiment, a method for testing a fluid line for inconsistencies may be provided. The fluid line may be placed in an interior of a pressure vessel. At least one end of the fluid line may be sealed. A pressure in the interior of the pressure vessel may be changed with the fluid line in the interior of the pressure vessel. The pressure in the interior of the pressure vessel may be monitored while the fluid line is allowed to vent into an environment outside of the pressure vessel.

The features, functions, and advantages may be achieved independently in various embodiments of the present disclosure or may be combined in yet other embodiments in which further details may be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof will best be understood by reference to the following detailed description of an advantageous embodiment of the present disclosure when read in conjunction with the accompanying drawings, wherein:

DETAILED DESCRIPTION

The different advantageous embodiments recognize and take into account different considerations. For example, the different advantageous embodiments recognize and take into account that some currently available methods for testing a vacuum hose may take more time than desired to identify the presence of a leak in the vacuum hose.

Further, the different advantageous embodiments recognize and take into account that some currently available methods for testing a vacuum hose may be more expensive than desired. For example, without limitation, with some currently available methods for testing a vacuum hose in an autoclave oven, the time and cost needed to test the vacuum hose in an autoclave oven may increase as the size of the autoclave oven increases.

Thus, the different advantageous embodiments provide a method and apparatus for testing fluid lines, such as vacuum hoses. In one advantageous embodiment, an apparatus may comprise a pressure vessel, a pressurization system, and a sensor system. The pressurization system may be configured to change a pressure in an interior of the pressure vessel. The sensor system may be configured to monitor a number of characteristics with respect to a fluid line in the pressure vessel while the pressurization system changes the pressure in the interior of the pressure vessel.

Figure 1:
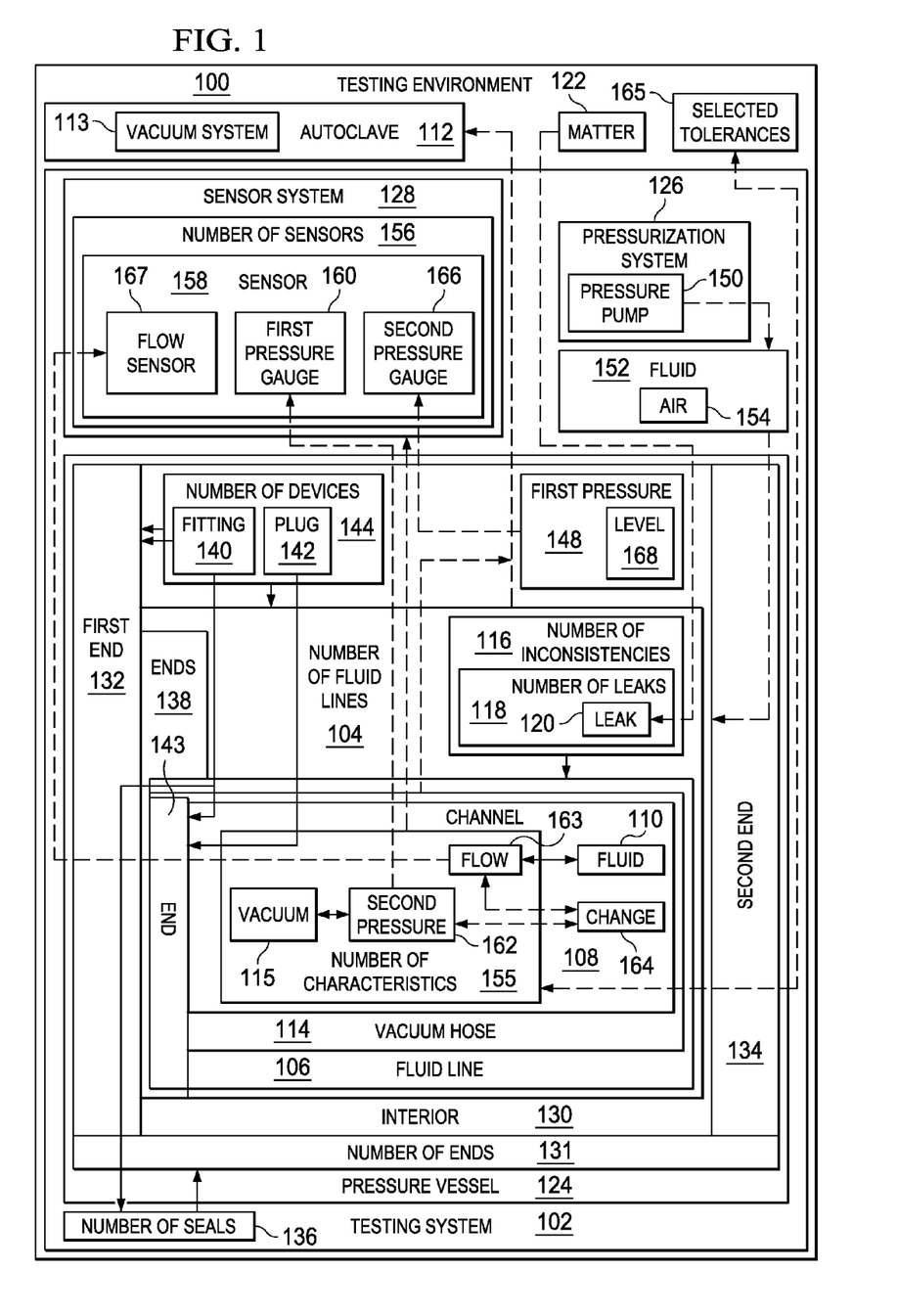
FIG. 1 is an illustration of a testing environment in the form of a block diagram in accordance with an advantageous embodiment.

With reference now to FIG. 1, an illustration of a testing environment in the form of a block diagram is depicted in accordance with an advantageous embodiment. Testing environment 100 may include testing system 102 configured to test number of fluid lines 104. As used herein, a "number of" items means one or more items. For example, number of fluid lines 104 means one or more fluid lines.

In these illustrative examples, fluid line 106 may be an example of one of number of fluid lines 104. Fluid line 106 may be a structure having channel 108 configured to carry fluid 110. In other words, fluid line 106 may be a hollow structure having channel 108. Fluid line 106 may take a number of different forms. For example, without limitation, fluid line 106 may comprise at least one of a hose, a tube, a pipe, a cylinder, a line, a vacuum hose, and some other suitable type of hollow structure or structure having an opening for channel 108.

As used herein, the phrase "at least one of", when used with a list of items, means different combinations of one or more of the listed items may be used and only one of each item in the list may be needed. For example, "at least one of item A, item B, and item C" may include, for example, without limitation, item A, or item A and item B. This example also may include item A, item B, and item C, or item B and item C. In other examples, "at least one of" may be, for example, without limitation, two of item A, one of item B, and ten of item C; four of item B and seven of item C; and other suitable combinations.

Fluid 110 carried in fluid line 106 may comprise at least one of a liquid and a gas. For example, without limitation, fluid 110 may comprise at least one of an inert gas, nitrogen gas, carbon dioxide gas, hydrogen gas, neon gas, argon gas, and some other suitable type of fluid. Depending on the implementation, the fluids carried in the different fluid lines in number of fluid lines 104 may be the same or different.

In these illustrative examples, number of fluid lines 104 may be configured for use in a system, a device, a piece of equipment, a cooling system, a heating system, and/or some other suitable type of object. In one illustrative example, number of fluid lines 104 may be configured for use in autoclave 112. Autoclave 112 also may be referred to as an autoclave oven.

For example, without limitation, fluid line 106 may take the form of vacuum hose 114 for use in autoclave 112. In some cases, vacuum hose 114 may be configured to be connected to vacuum system 113. In these illustrative examples, when a first component, such as vacuum system 113, is "connected to" a second component, such as vacuum hose 114, this connection is a physical connection. As used herein, a first component "connected to" a second component means that the first component may be connected directly or indirectly to the second component.

In other words, additional components may be present between the first component and the second component. The first component may be considered to be indirectly connected to the second component when one or more additional components are present between the two components. When the first component is directly connected to the second component, no additional components may be present between the two components.

In these illustrative examples, vacuum system 113 and vacuum hose 114 may be fluidly connected to each other. In other words, fluid may be allowed to flow between vacuum system 113 and vacuum hose 114. This flow may be a controlled flow. In these depicted examples, vacuum system 113 may be configured to apply vacuum 115 to channel 108 of fluid line 106 when connected to vacuum hose 114.

Testing system 102 in testing environment 100 may be configured to test number of fluid lines 104 prior to number of fluid lines 104 being used. In particular, testing system 102 may be configured to test for number of inconsistencies 116 in number of fluid lines 104. One or more of number of inconsistencies 116 may be present in one or more of number of fluid lines 104.

In these illustrative examples, number of inconsistencies 116 may take the form of, for example, without limitation, number of leaks 118. As used herein, a "leak" may be an opening or a hole in a fluid line, such as fluid line 106. Leak 120 may be an example of one of number of leaks 118.

In one illustrative example, leak 120 may be present in fluid line 106. Leak 120 may allow matter 122 located outside of fluid line 106 to enter channel 108 through leak 120. Matter 122 may include, for example, without limitation, solid particles, a granular solid, a powdered material, a viscous paste, and/or some other type of matter that can be carried in fluid line 106. In some cases, leak 120 may allow fluid 110 in channel 108 to exit fluid line 106. This flow of matter 122 into channel 108 and fluid 110 out of channel 108 may be an unintentional and undesired flow.

Testing system 102 may include pressure vessel 124, pressurization system 126, and sensor system 128. In these illustrative examples, pressure vessel 124 may be any object configured to hold number of fluid lines 104 in interior 130 of pressure vessel 124. Further, pressure vessel 124 may be any object that may be sealed.

Pressure vessel 124 may take a number of different forms. For example, without limitation, pressure vessel 124 may be selected from at least one of a pipe, a tube, a chamber, a container, a tank, an enclosed structure, a pressure tank, a pressure pot, and some other suitable type of pressure vessel.

In one illustrative example, pressure vessel 124 may have number of ends 131. Number of ends 131 may include first end 132 and second end 134. When pressure vessel 124 is a pipe, first end 132 and second end 134 may be open.

When pressure vessel 124 is a pressure tank, first end 132 may be configured to be open or closed, while second end 134 may be closed. For example, without limitation, a lid or some other suitable type of structure may be present at first end 132 of the pressure tank and may be configured to open or close first end 132. In this manner, interior 130 may be accessed through first end 132. Second end 134 may be, for example, without limitation, a base for the pressure tank.

Testing number of fluid lines 104 may include sealing ends 138 of number of fluid lines 104. In these illustrative examples, number of devices 144 may be configured to perform at least one of sealing ends 138 of number of fluid lines 104 and connecting number of fluid lines 104 to pressure vessel 124. Number of devices 144 may include, for example, without limitation, at least one of a plug, a bell reducer, a bolt, a stopper, a screw, a cap, a seal, a connector, a connecting component, and other suitable types of parts.

In one illustrative example, number of devices 144 may include fitting 140 configured to connect fluid line 106 to pressure vessel 124. For example, without limitation, fitting 140 may be configured to connect end 143 of fluid line 106 to a seal in number of seals 136 at first end 132 of pressure vessel 124. Further, number of devices 144 may include plug 142 configured to seal end 143 of fluid line 106. Number of seals 136 is configured to seal number of ends 131 of pressure vessel 124 such that interior 130 of pressure vessel 124 is a closed space.

After ends 138 of number of fluid lines 104 are sealed and number of fluid lines 104 are placed in pressure vessel 124, number of ends 131 of pressure vessel 124 may be sealed using number of seals 136. A seal in number of seals 136 may comprise at least one of a cap, a fitting, a bell reducer, a sealing component, a plate, a lid, a cover, and some other suitable type of seal for an end in number of ends 131.

After number of ends 131 of pressure vessel 124 is sealed, pressurization system 126 may be configured to change first pressure 148 in interior 130 of pressure vessel 124. In particular, in these illustrative examples, pressurization system 126 may change first pressure 148 by increasing first pressure 148 in interior 130 of pressure vessel 124. In other words, pressurization system 126 may apply pressure to or pressurize interior 130 of pressure vessel 124. Of course, in other illustrative examples, pressurization system 126 may change first pressure 148 by reducing first pressure 148 in interior 130 of pressure vessel 124.

As one illustrative example, pressurization system 126 may comprise pressure pump 150. Pressure pump 150 may be configured to pump fluid 152 into or out of interior 130 such that first pressure 148 in interior 130 changes. For example, without limitation, pressure pump 150 may be configured to pump fluid 152 into or out of interior 130 such that first pressure 148 may increase.

In one illustrative example, fluid 152 may be air 154. Of course, in other illustrative examples, fluid 152 may take some other suitable form. Depending on the implementation, fluid 152 may be the same as or different from the fluids carried in number of fluid lines 104.

As depicted, pressurization system 126 may be connected to pressure vessel 124. In one illustrative example, pressurization system 126 may be connected to a seal in number of seals 136 at second end 134 of pressure vessel 124. In particular, pressurization system 126 may be fluidly connected to this seal such that fluid 152 may be allowed to flow from pressurization system 126 into interior 130 of pressure vessel 124.

In these illustrative examples, sensor system 128 in testing system 102 may be configured to monitor number of characteristics 155 with respect to each of number of fluid lines 104. For example, without limitation, sensor system 128 may comprise number of sensors 156 configured to monitor number of characteristics 155 with respect to number of fluid lines 104.

Sensor 158 may be an example of one of number of sensors 156. Sensor 158 may be fluidly connected to fluid line 106 in this depicted example. Sensor 158 may be configured to monitor a characteristic in number of characteristics 155 with respect to fluid line 106. A characteristic in number of characteristics 155 may be selected from one of, for example, without limitation, second pressure 162 in channel 108 inside fluid line 106, flow 163 of fluid 110 in fluid line 106, vacuum 115, and some other suitable type of characteristic.

Change 164 in a characteristic in number of characteristics 155 may indicate the presence of one or more leaks in fluid line 106. In particular, change 164 in a characteristic in number of characteristics 155 outside of selected tolerances 165 may indicate that one or more leaks in fluid line 106 may require further attention. For example, without limitation, change 164 outside of selected tolerances 165 may indicate that further testing may be needed and/or that fluid line 106 may need to be repaired and/or replaced.

For example, without limitation, sensor 158 may be configured to monitor second pressure 162 in channel 108 inside fluid line 106 while pressurization system 126 increases first pressure 148 in interior 130 of pressure vessel 124. In one illustrative example, sensor 158 may take the form of first pressure gauge 160. First pressure gauge 160 may be configured to monitor second pressure 162 in channel 108 of fluid line 106 to test fluid line 106 for the presence of leaks, such as leak 120.

In particular, first pressure gauge 160 may detect any changes in second pressure 162 inside channel 108 that occur in response to first pressure 148 increasing in interior 130 of pressure vessel 124. In these illustrative examples, change 164 in second pressure 162 inside channel 108 outside of selected tolerances 165 may indicate the presence of one or more leaks in fluid line 106, such as leak 120.

When fluid line 106 takes the form of vacuum hose 114, change 164 in pressure 117 may be a loss of vacuum 115 inside channel 108. In other words, change 164 may be an increase in second pressure 162. Of course, in other illustrative examples, change 164 may be a decrease in second pressure 162.

In some illustrative examples, sensor system 128 also may include second pressure gauge 166. Second pressure gauge 166 may be configured to monitor first pressure 148 in interior 130 of pressure vessel 124. In this manner, level 168 for first pressure 148 at which change 164 occurs may be identified.

In other illustrative examples, sensor 158 may take the form of flow sensor 167. Flow sensor 167 may be configured to monitor flow 163 of fluid 110 inside fluid line 106 while first pressure 148 is increased. Change 164 in flow 163 outside of selected tolerances 165 may indicate the presence of one or more leaks in fluid line 106.

In one illustrative example, a portion of each of number of sensors 156 may be located outside of pressure vessel 124 such that an operator may be able to view the pressure readings generated by these sensors. For example, without limitation, a portion of first pressure gauge 160 may be located outside of pressure vessel 124, while another portion of first pressure gauge 160 may be located inside of pressure vessel 124.

In this manner, the different advantageous embodiments may provide a method and apparatus for testing number of fluid lines 104 for number of inconsistencies 116 that may be present in number of fluid lines 104. Further, the different advantageous embodiments may provide a method and apparatus for testing number of fluid lines 104 that may be less time consuming and expensive than currently available systems.

The illustration of testing environment 100 in FIG. 1 is not meant to imply physical or architectural limitations to the manner in which an advantageous embodiment may be implemented. Other components in addition to and/or in place of the ones illustrated may be used. Some components may be unnecessary. Also, the blocks are presented to illustrate some functional components. One or more of these blocks may be combined, divided, or combined and divided into different blocks when implemented in an advantageous embodiment.

For example, in some illustrative examples, sensor system 128 may be located inside pressure vessel 124. Sensor system 128 may be configured to wirelessly transmit pressure readings for number of fluid lines 104 to a location at which an operator may view these pressure readings.

In other illustrative examples, fluid line 106 may be configured to carry other matter in addition to or in place of fluid 110. This matter may include, for example, without limitation, solid particles, a granular solid, a powdered material, a viscous paste, and some other type of matter.

In still other illustrative examples, pressurization system 126 may be configured to increase second pressure 162 inside channel 108 in fluid line 106, while reducing first pressure 148 in interior 130 of pressure vessel 124. In this manner, fluid line 106 may be tested for any inconsistencies in fluid line 106 that may cause fluid 110 in channel 108 to flow into interior 130 of pressure vessel 124.

With reference now to FIGS. 2-7, illustrations of different types of testing systems are depicted in accordance with an advantageous embodiment. The different components shown in FIGS. 2-7 for testing system 200 in FIGS. 2-4, testing system 500 in FIG. 5, and testing system 600 in FIGS. 6-7 may be combined with components in FIG. 1, used with components in FIG. 1, or a combination of the two. Additionally, some of the components in these figures may be illustrative examples of how components shown in block form in FIG. 1 may be implemented as physical structures.

Figure 2:
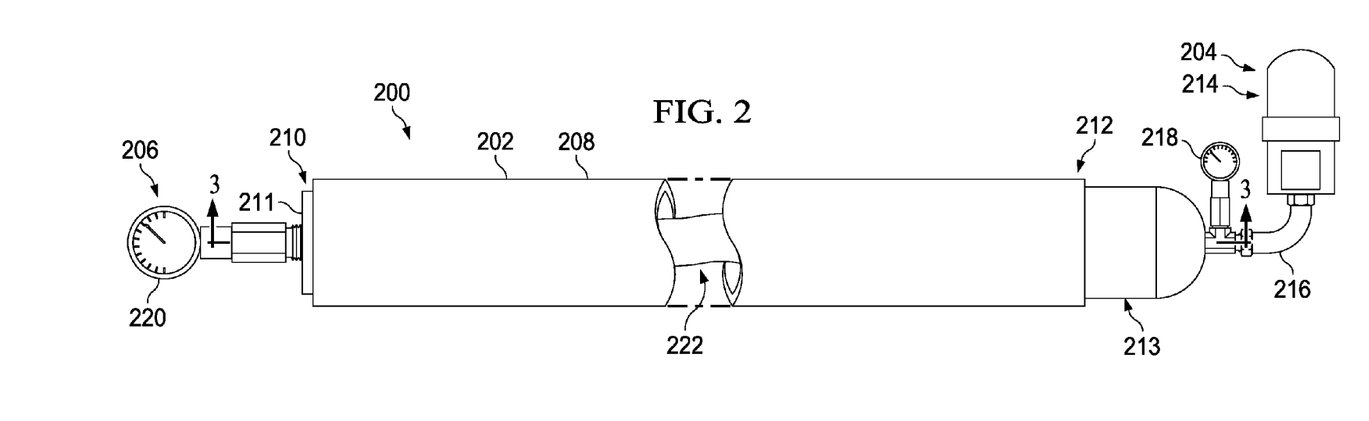
FIG. 2 is an illustration of a partially-exposed view of a testing system in accordance with an advantageous embodiment.

Turning now to FIG. 2, an illustration of a partially-exposed view of a testing system is depicted in accordance with an advantageous embodiment. In this illustrative example, testing system 200 may be an example of one implementation for testing system 102 in FIG. 1. As depicted, testing system 200 may include pressure vessel 202, pressurization system 204, and sensor system 206.

Pressure vessel 202 may take the form of pipe 208 in this depicted example. Pipe 208 may be comprised of a number of different materials. These materials may include, for example, without limitation, plastic, zinc, steel, aluminum, a composite material, and other suitable types of materials.

As depicted, pipe 208 may have first end 210 and second end 212. First end 210 and second end 212 are sealed by seal 211 and seal 213, respectively, in this example. Pressurization system 204 may include pressure pump 214 connected to pipe 208 at seal 213 at second end 212 of pipe 208.

Pressure pump 214 may be configured to pump air (not shown) into an interior (not shown) of pipe 208 through line 216 such that a pressure inside the interior of pipe 208 increases. Of course, in other illustrative examples, pressure pump 214 may be configured to increase a pressure inside the interior of pipe 208.

As depicted, sensor system 206 may include pressure gauge 218 and pressure gauge 220. Pressure gauge 218 may be configured to monitor a pressure of the air (not shown) being pumped into the interior (not shown) of pipe 208. Further, pressure gauge 220 may be configured to monitor a pressure of vacuum hose 222 located inside pipe 208. Vacuum hose 222 may be fluidly connected to pressure gauge 220 through seal 211 at first end 210 of pipe 208.

Figure 3:
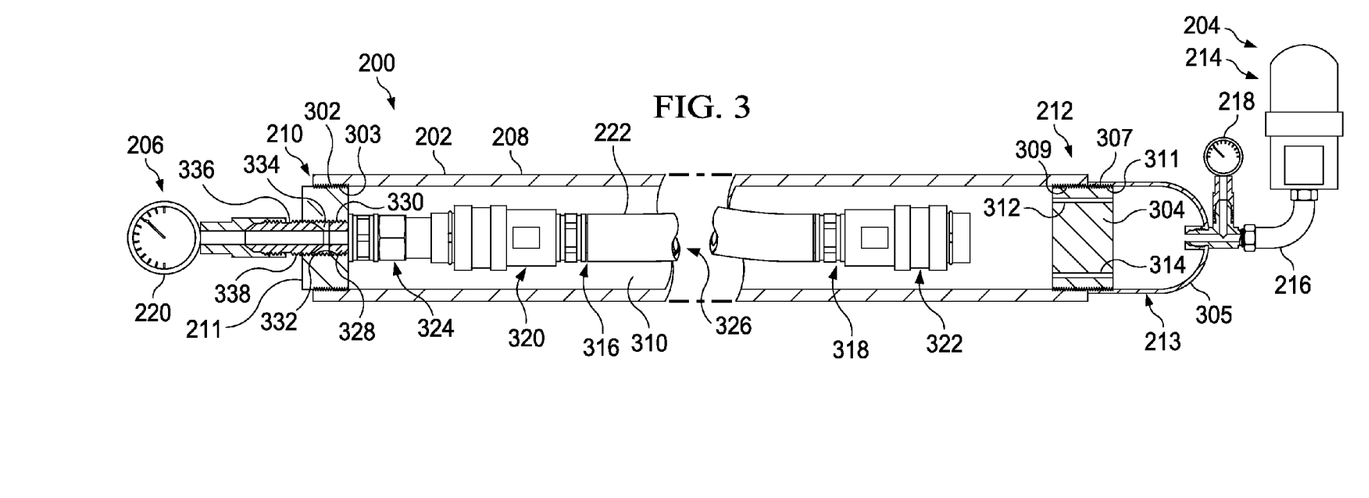
FIG. 3 is an illustration of a cross-sectional cutaway view of a testing system in accordance with an advantageous embodiment.

With reference now to FIG. 3, an illustration of a cross-sectional cutaway view of a testing system is depicted in accordance with an advantageous embodiment. A cross-sectional view of testing system 200 from FIG. 2 taken along lines 3-3 in FIG. 2 may be depicted in FIG. 3.

In this illustrative example, seal 211 may include external threads 302 configured to connect seal 211 to internal threads 303 at first end 210 of pipe 208. In this manner, seal 211 may be configured to seal first end 210 of pipe 208.

Further, seal 213 may include component 304 and cap 305. Component 304 may have external threads 307 configured to connect component 304 of seal 213 to internal threads 309 at second end 212 of pipe 208 and connect component 304 of seal 213 to internal threads 311 of cap 305.

As depicted, pressure pump 214 may be connected to cap 305 of seal 213. Further, component 304 may have channel 312 and channel 314. Channel 312 and channel 314 may allow air introduced by pressure pump 214 to flow into interior 310 of pipe 208. In this manner, pressure pump 214 may be connected to pipe 208 at first end 210 instead of second end 212 in other illustrative examples.

As depicted, vacuum hose 222 may have end 316 and end 318. Seal 320 may seal end 316 of vacuum hose 222, while seal 322 may seal end 318 of vacuum hose 222. Further, as illustrated, fitting 324 may connect seal 211 to first end 210 of pipe 208. In particular, fitting 324 may have member 328 with external threads 330. External threads 330 may be configured to connect member 328 to internal threads 332 of channel 334 in seal 211. Further, pressure gauge 220 may have member 336 with external threads 338 configured to connect member 336 to internal threads 332 of channel 334 in seal 211.

These connections may allow pressure gauge 220 also connected to seal 211 at first end 210 of pipe 208 to be fluidly connected to vacuum hose 222. As a result, pressure gauge 220 may be able to monitor a pressure in channel 326 inside vacuum hose 222.

Figure 4:
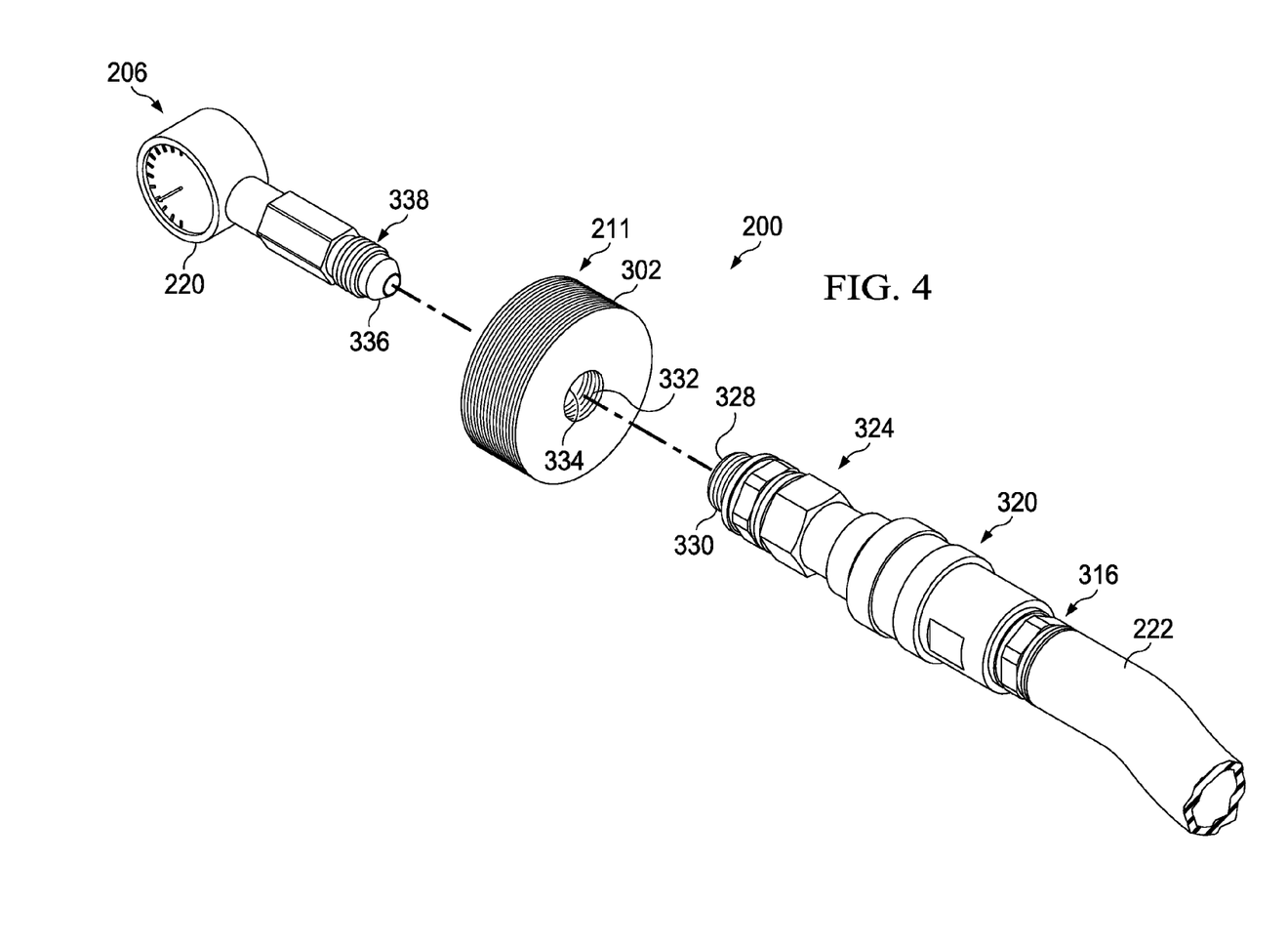
FIG. 4 is an illustration of an exploded perspective view of a portion of a testing system in accordance with an advantageous embodiment.

With reference now to FIG. 4, an illustration of an exploded perspective view of a portion of a testing system is depicted in accordance with an advantageous embodiment. Pipe 208 of testing system 200 in FIG. 2 and FIG. 3 may be excluded in FIG. 4 so that other components of testing system 200 may be more clearly seen. In this illustrative example, seal 211, pressure gauge 220, member 336 of pressure gauge 220, fitting 324, seal 320, member 328 of fitting 324, and a portion of vacuum hose 222 from FIG. 3 are depicted in an exploded perspective view.

Figure 5:
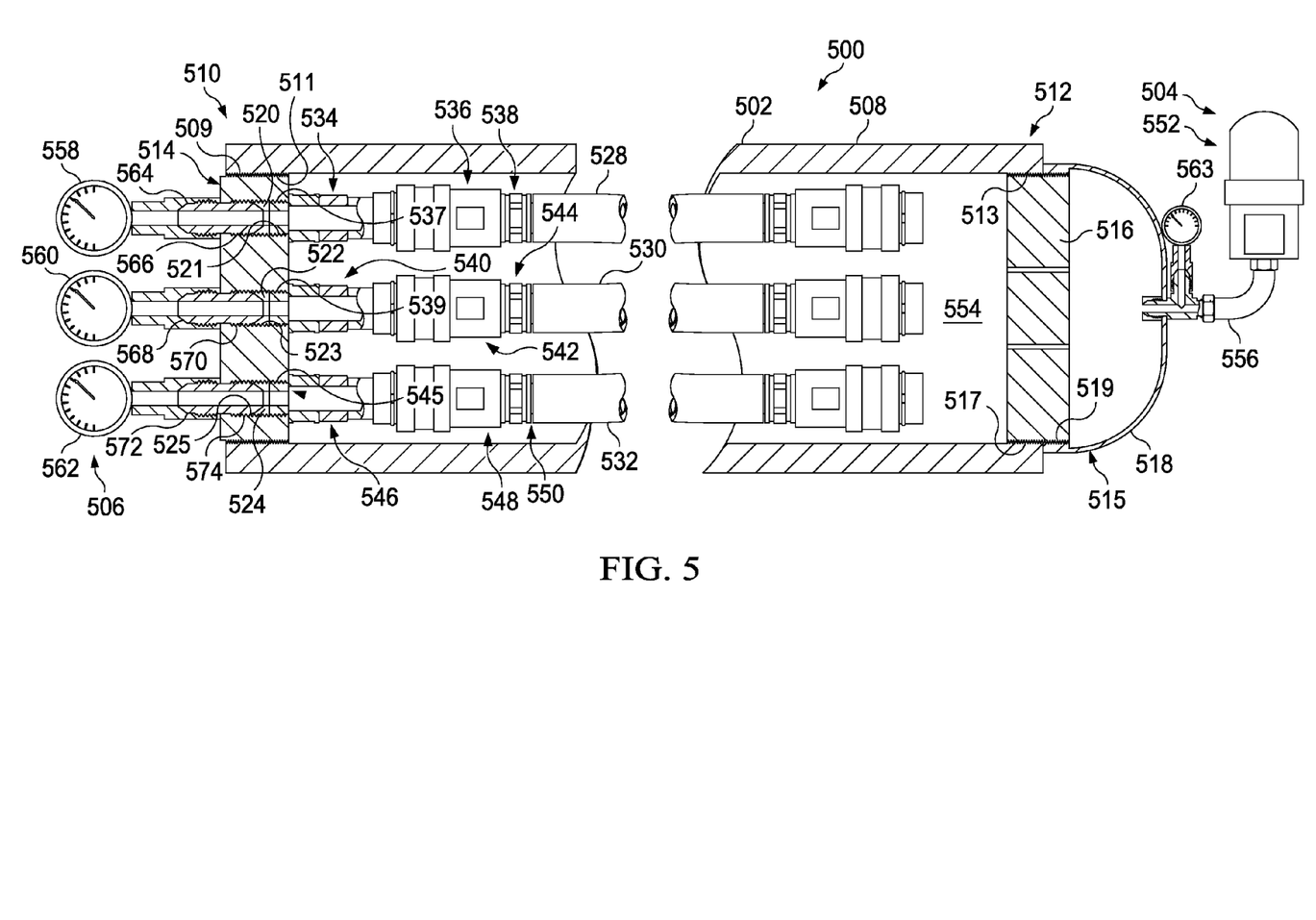
FIG. 5 is an illustration of a cross-sectional cutaway view of a testing system in accordance with an advantageous embodiment.

Turning now to FIG. 5, an illustration of a cross-sectional cutaway view of a testing system is depicted in accordance with an advantageous embodiment. In this illustrative example, a cross-sectional cutaway view of testing system 500 is depicted. Testing system 500 may be an example of one implementation for testing system 102 in FIG. 1. Further, testing system 500 may be implemented similar to the manner in which testing system 200 in FIGS. 2-4 may be implemented. However, testing system 500 may be configured to test more than one vacuum hose.

In this illustrative example, testing system 500 may include pressure vessel 502, pressurization system 504, and sensor system 506. As depicted, pressure vessel 502 may take the form of pipe 508. Pipe 508 may have first end 510 and second end 512. First end 510 may have internal threads 511, while second end 512 may have internal threads 513.

First end 510 may be sealed by seal 514, while second end 512 may be sealed by seal 515. Seal 514 may have external threads 509 configured to connect seal 514 to internal threads 511 at first end 510 of pipe 508. Further, as depicted, seal 515 may include component 516 and cap 518. Component 516 may have external threads 517 configured to connect component 516 of seal 515 to internal threads 513 at second end 512 of pipe 508 and connect component 516 to internal threads 519 of cap 518.

As depicted, seal 514 may include channel 520 for connection to vacuum hose 528, channel 522 for connection to vacuum hose 530, and channel 524 for connection to vacuum hose 532. Channel 520, channel 522, and channel 524 may have internal threads 521, internal threads 523, and internal threads 525, respectively.

Fitting 534 may be connected to seal 536 at end 538 of vacuum hose 528. Fitting 534 may have external threads 537 configured to connect fitting 534 to internal threads 521 of channel 520. In this manner, fitting 534 may connect seal 536 at end 538 of vacuum hose 528 to first end 510 of pipe 508.

Similarly, fitting 540 may be connected to seal 542 at end 544 of vacuum hose 530. Fitting 540 may have external threads 539 configured to connect fitting 540 to internal threads 523 of channel 522. In this manner, fitting 540 may connect seal 542 at end 544 of vacuum hose 530 to first end 510 of pipe 508.

Further, fitting 546 may be connected to seal 548 at end 550 of vacuum hose 532. Fitting 546 may have external threads 545 configured to connect fitting 546 to internal threads 525 of channel 524. In this manner, fitting 546 may connect seal 548 at end 550 of vacuum hose 532 to first end 510 of pipe 508.

In this illustrative example, pressurization system 504 may include pressure pump 552 configured to pump air into interior 554 of pipe 508 through line 556 such that a pressure inside interior 554 of pipe 508 increases. Further, sensor system 506 may be configured to monitor the pressure inside vacuum hose 528, vacuum hose 530, and vacuum hose 532 while the pressure inside interior 554 is increased.

In particular, sensor system 506 may include pressure gauge 558 for monitoring vacuum hose 528, pressure gauge 560 for monitoring vacuum hose 530, and pressure gauge 562 for monitoring vacuum hose 532. Further, sensor system 506 also may include pressure gauge 563 for measuring the pressure of air being pumped into interior 554 of pipe 508.

Pressure gauge 558 may have member 564 with external threads 566 configured to connect member 564 to internal threads 521 of channel 520. Pressure gauge 560 may have member 568 with external threads 570 configured to connect member 568 to internal threads 523 of channel 522. Pressure gauge 562 may have member 572 with external threads 574 configured to connect member 572 to internal threads 525 of channel 524. In this manner, pressure gauge 558, pressure gauge 560, and pressure gauge 562 may be fluidly connected to vacuum hose 528, vacuum hose 530, and vacuum hose 532, respectively.

Figure 6:
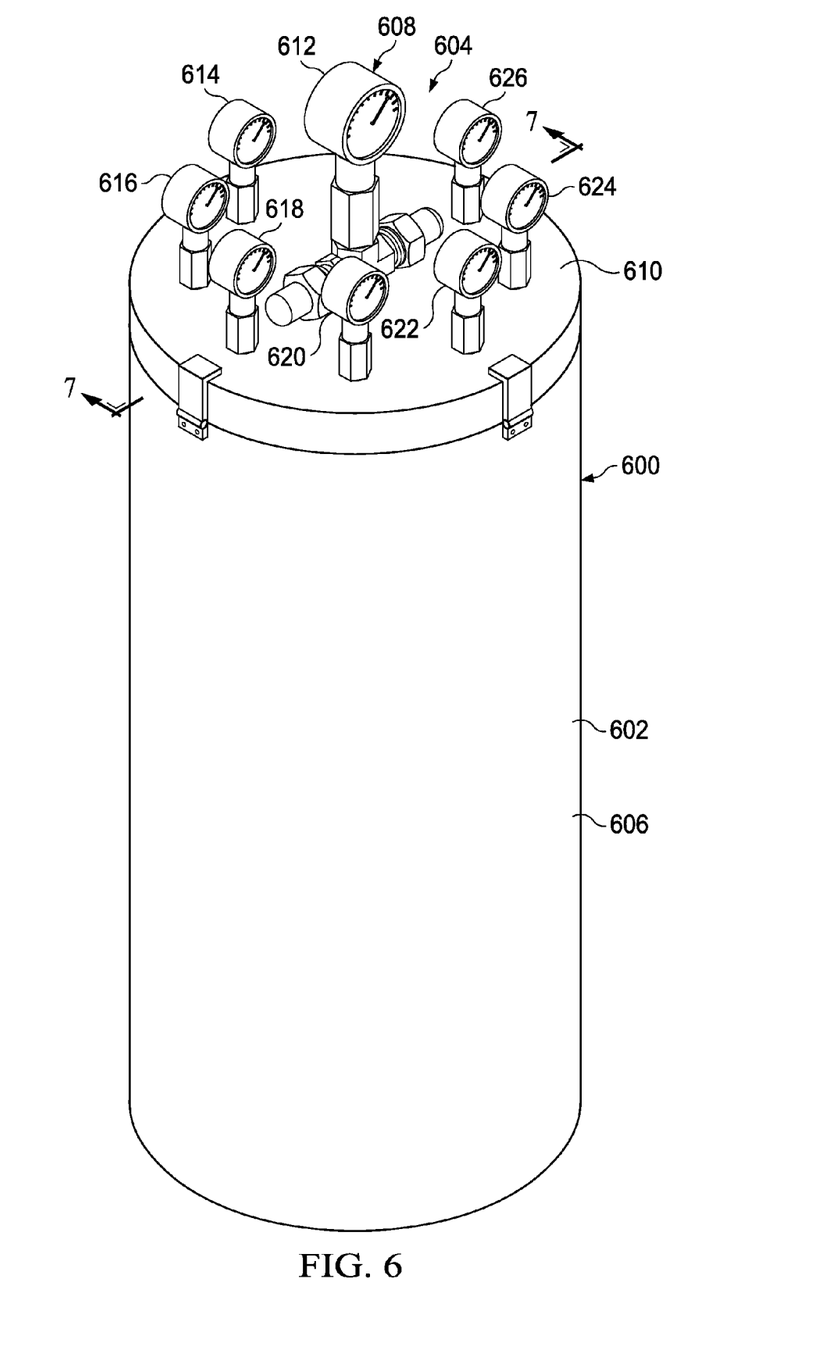
FIG. 6 is an illustration of another testing system in accordance with an advantageous embodiment.

With reference now to FIG. 6, an illustration of another testing system is depicted in accordance with an advantageous embodiment. In this illustrative example, testing system 600 may be an example of one implementation for testing system 102 in FIG. 1. Pressure vessel 602 and sensor system 604 for testing system 600 may be seen in this view.

Pressure vessel 602 may take the form of pressure tank 606 in this depicted example. Sensor system 604 may include pressure gauges 608 connected to lid 610 of pressure tank 606. Lid 610 may be removable in these illustrative examples. Pressure gauges 608 may include pressure gauges 612, 614, 616, 618, 620, 622, 624, and 626.

Figure 7:
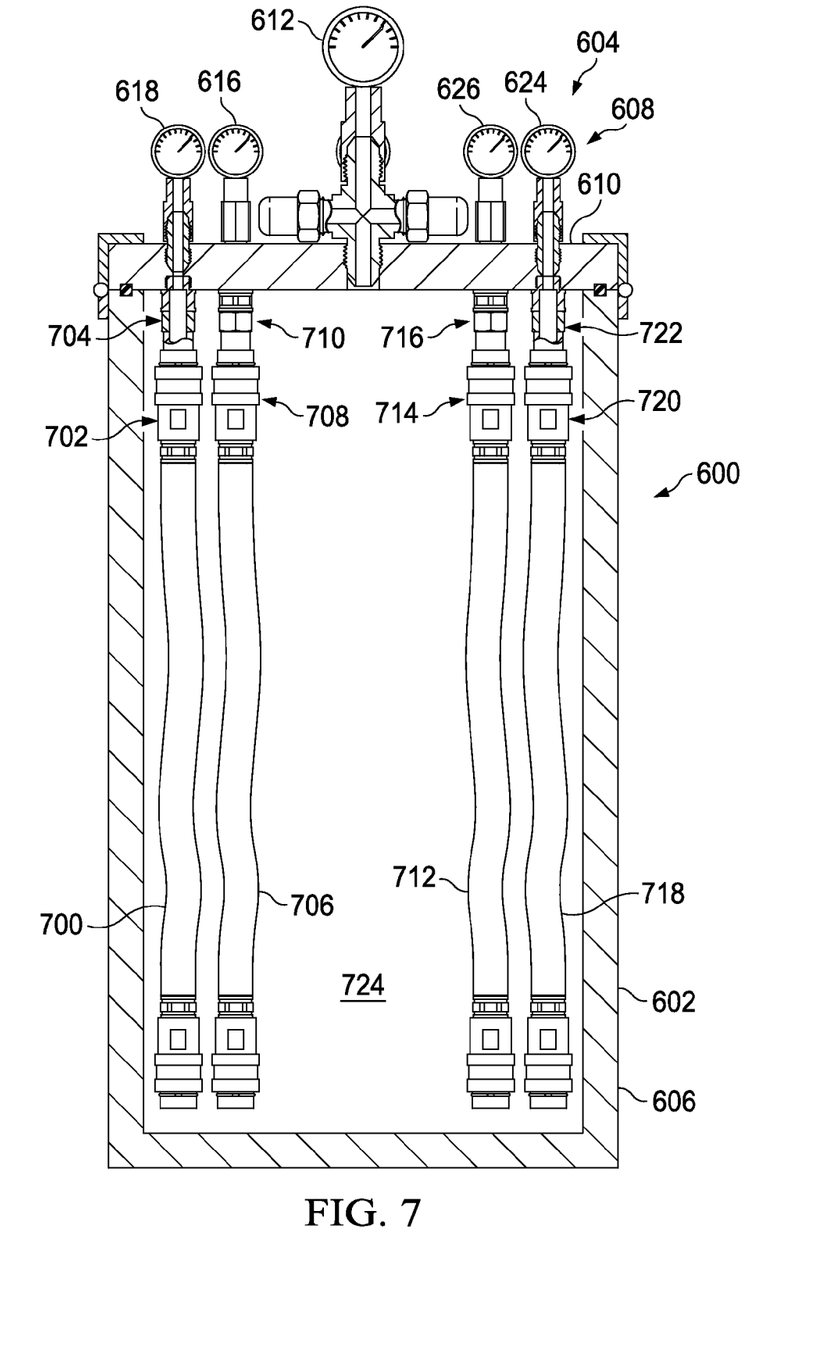
FIG. 7 is an illustration of a cross-sectional view of a portion of a testing system in accordance with an advantageous embodiment.

Turning now to FIG. 7, an illustration of a cross-sectional view of a portion of a testing system is depicted in accordance with an advantageous embodiment. In this illustrative example, a cross-sectional view of testing system 600 from FIG. 6 taken along lines 7-7 in FIG. 6 may be depicted. A pressurization system, such as pressurization system 126 in FIG. 1, has been excluded in this view.

As depicted, vacuum hose 700 may be connected to lid 610 of pressure tank 606 through seal 702 and fitting 704. Vacuum hose 706 may be connected to lid 610 of pressure tank 606 through seal 708 and fitting 710. Further, vacuum hose 712 may be connected to lid 610 of pressure tank 606 through seal 714 and fitting 716. Vacuum hose 718 may be connected to lid 610 of pressure tank 606 through seal 720 and fitting 722.

In this illustrative example, pressure gauge 612 in sensor system 604 may monitor a pressure in interior 724 of pressure tank 606. Interior 724 may be pressurized using a pressurization system (not shown), such as pressurization system 126 in FIG. 1. Pressure gauges 618, 616, 626, and 624 may monitor the pressure inside vacuum hoses 700, 706, 712, and 718, respectively, while interior 724 is pressurized.

The illustrations of testing system 200 in FIGS. 2-4, testing system 500 in FIG. 5, and testing system 600 in FIGS. 6-7 are not meant to imply physical or architectural limitations to the manner in which an advantageous embodiment may be implemented. Other components in addition to and/or in place of the ones illustrated may be used. Some components may be unnecessary.

For example, without limitation, pressure gauge 220 at first end 210 in FIGS. 2-4 may be excluded from testing system 200. Instead, channel 334 in seal 211 may be left open to the environment outside of pipe 208. In this manner, vacuum hose 222 may be allowed to vent into the environment outside of pipe 208.

In one illustrative example, a removable seal (not shown), may be used to close channel 334. This removable seal may take the form of, for example, without limitation, a plug, a stopper, or some other suitable type of seal that may be placed in channel 334, instead of member 336 of pressure gauge 220, and then removed at a later point in time to allow vacuum hose 222 to vent into the environment outside of pipe 208.

In some cases, a device (not shown) that may be configured to be both open and closed may be used to close channel 334. This device may take the form of, for example, without limitation, a cap that may be inserted in channel 334 instead of member 336 of pressure gauge 220 and then opened at a later point in time to allow vacuum hose 222 to vent into the environment outside of pipe 208.

In this illustrative example, pressure pump 214 may be configured to change the pressure in interior 310 of pipe 208 while channel 334 is closed with a removable seal (not shown) or some other suitable type of device (not shown). In particular, pressure pump 214 may be configured to pump air (not shown) into interior 310 of pipe 208 to increase the pressure in interior 310 of pipe 208 while channel 334 of seal 211 is closed.

Once the pressure in interior 310 of pipe 208 has reached substantially a selected pressure, channel 334 may be opened to the environment outside of pipe 208 to allow vacuum hose 222 to vent into this environment. Pressure gauge 218 at second end 212 of pipe 208 may be used to monitor the pressure in interior 310 of pipe 208 while vacuum hose 222 is allowed to vent into this environment.

A change in the pressure in interior 310 of pipe 208 outside of selected tolerances may indicate the presence of an inconsistency, such as a leak, in vacuum hose 222. In other words, a leak in vacuum hose 222 may cause air (not shown) in interior 310 of pipe 208 to enter vacuum hose 222 when vacuum hose 222 is allowed to vent into the environment outside of pipe 208.

Of course, in other illustrative examples, channel 334 may be left open while pressure pump 214 pumps air into interior 310 of pipe 208. In this manner, vacuum hose 222 may be allowed to vent while the pressure in interior 310 of pipe 208 is changed. Once a substantially selected pressure has been reached in interior 310 of pipe 208, pressure gauge 218 may be used to monitor the pressure in interior 310 of pipe 208. A change in the pressure in interior 310 of pipe 208 from substantially the selected pressure may indicate the presence of a leak in vacuum hose 222.

In this illustrative example, the environment outside of pipe 208 may be the atmosphere around pipe 208. However, in other illustrative examples, the environment outside of pipe 208 may be the interior of a container connected to pipe 208 through channel 334 of seal 211 or some other suitable type of environment.

Figure 8:
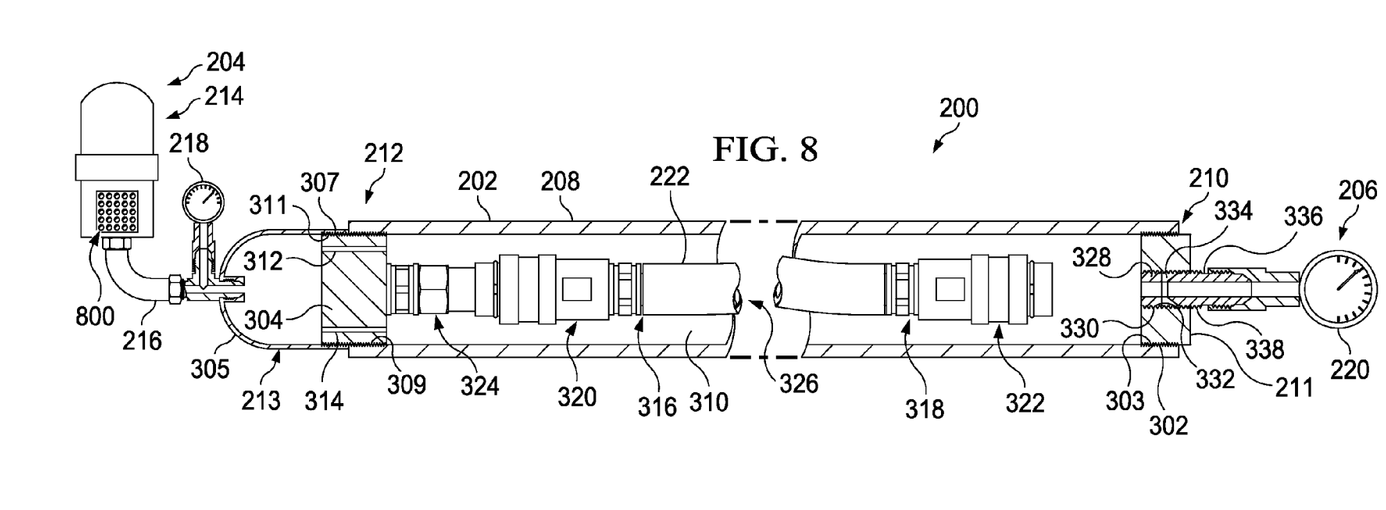
FIG. 8 is an illustration of another type of testing system in accordance with an advantageous embodiment.

With reference now to FIG. 8, an illustration of another type of testing system is depicted in accordance with an advantageous embodiment. In FIG. 8, testing system 200 from FIG. 2 may be shown with pressure gauge 218 connected to first end 210 of pipe 208 instead of second end 212 as is seen in FIG. 2. Further, in FIG. 8, pressure gauge 220 from FIG. 2 may be shown connected to second end 212 of pipe 208 instead of first end 210 as is seen in FIG. 2.

Additionally, in this figure, pressurization system 204 may be shown fluidly connected to vacuum hose 222. Pressurization system 204 may have vent 800 in this illustrative example. Pressure pump 214 of pressurization system 204 may be configured to pump fluid (not shown) out of vacuum hose 222.

For example, without limitation, the fluid (not shown) inside vacuum hose 222 may be air (not shown). Pressure pump 214 may be configured to pump this air out of vacuum hose 222 and vent this air into the environment around pressurization system 204 through vent 800. In this manner, pressure pump 214 may decrease the pressure inside vacuum hose 222.

Further, pressure gauge 220 may be used to monitor the pressure in interior 310 of pipe 208 while the pressure inside vacuum hose 222 is being changed by pressurization system 204. A change in the pressure in interior 310 of pipe 208 outside of selected tolerances may indicate the presence of one or more leaks in vacuum hose 222. In this manner, testing system 200 may be configured in a number of different ways to test for the presence of inconsistencies in a fluid line, such as vacuum hose 222.

Figure 9:
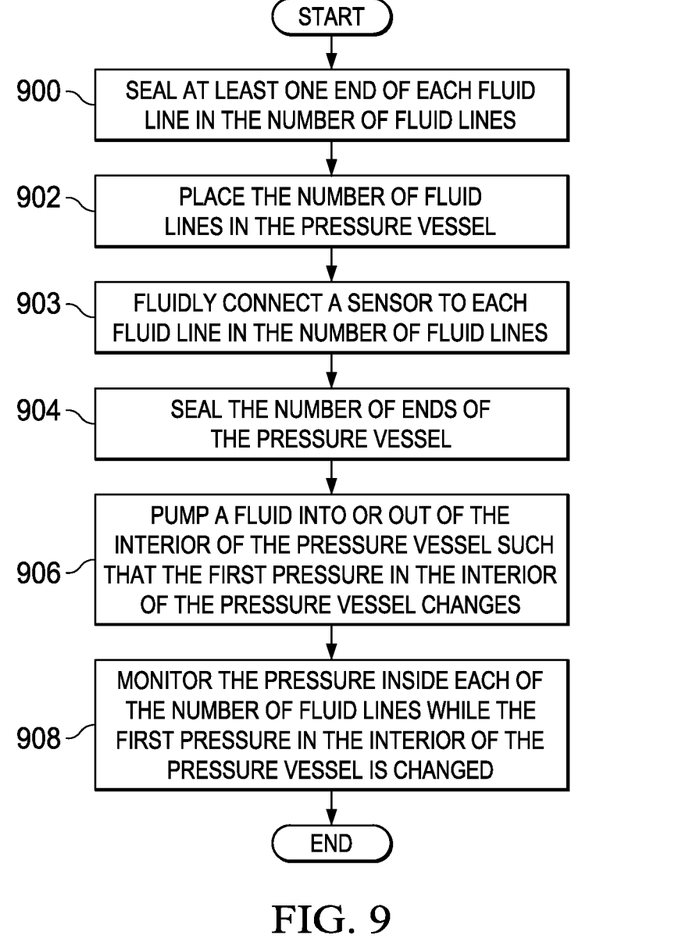
FIG. 9 is an illustration of a flowchart of a process for testing a number of fluid lines for inconsistencies in accordance with an advantageous embodiment.

With reference now to FIG. 9, an illustration of a flowchart of a process for testing a number of fluid lines for inconsistencies is depicted in accordance with an advantageous embodiment. The process illustrated in FIG. 9 may be implemented using testing system 102 in FIG. 1. Further, this process may be implemented to test number of fluid lines 104 for inconsistencies, such as number of leaks 118 in FIG. 1.

In this illustrative example, number of fluid lines 104 may be vacuum hoses configured for use in an autoclave. Of course, in other illustrative examples, number of fluid lines 104 may include other types of fluid lines and/or may be configured for use in some other suitable type of system.

The process may begin by sealing at least one end of each fluid line in number of fluid lines 104 (operation 900). In operation 900, these ends may be sealed using number of devices 144 in FIG. 1. The process may then place number of fluid lines 104 in pressure vessel 124 (operation 902). Pressure vessel 124 may be implemented using, for example, without limitation, pipe 208 in FIG. 2, pipe 508 in FIG. 5, and pressure tank 606 in FIG. 6.

The process may then fluidly connect a sensor to each fluid line in the number of fluid lines (operation 903). Thereafter, the process may seal number of ends 131 of pressure vessel 124 (operation 904). In operation 904, number of ends 131 may be sealed using, for example, without limitation, number of seals 136. Then the process may pump fluid 152 into or out of interior 130 of pressure vessel 124 such that first pressure 148 in interior 130 of pressure vessel 124 changes (operation 906).

In one illustrative example, operation 906 may be performed by pumping fluid 152 into interior 130 of pressure vessel 124 such that first pressure 148 increases. In other words, interior 130 of pressure vessel 124 may be pressurized in operation 906. Operation 906 may be performed using pressurization system 126 in FIG. 1.

In operation 906, first pressure 148 may be increased up to a maximum level selected for first pressure 148 for testing number of fluid lines 104. This maximum level may be selected based on a number of different factors. These different factors may include, for example, without limitation, an operating pressure of the autoclave, an acceptable leak rate for number of fluid lines 104, and other suitable factors. The different advantageous embodiments provide a method and apparatus for testing number of fluid lines 104 at higher pressurization levels as compared to testing with currently available methods.

The process may monitor the pressure inside each of number of fluid lines 104 while first pressure 148 in interior 130 of pressure vessel 124 is changed (operation 908), with the process terminating thereafter. For example, without limitation, in operation 908, the process may monitor second pressure 162 in channel 108 inside fluid line 106 using sensor system 128, while first pressure 148 is changed by pressurization system 126 in FIG. 1. In one illustrative example, operation 908 may be performed while first pressure 148 is increased up to the maximum level selected for first pressure 148.

Any changes in the pressure inside a fluid line in number of fluid lines 104 may indicate one or more leaks in the fluid line. For example, without limitation, a change in second pressure 162 inside channel 108 of fluid line 106 may indicate the presence of leak 120.

The flowchart and block diagrams in the different depicted embodiments illustrate the architecture, functionality, and operation of some possible implementations of apparatuses and methods in an advantageous embodiment. In this regard, each block in the flowchart or block diagrams may represent a module, segment, function, and/or a portion of an operation or step. For example, one or more of the blocks may be implemented as program code, in hardware, or a combination of the program code and hardware. When implemented in hardware, the hardware may, for example, without limitation, take the form of integrated circuits that are manufactured or configured to perform one or more operations in the flowchart or block diagrams.

In some alternative implementations of an advantageous embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, in other illustrative examples, operation 908 in FIG. 9 may be replaced with an operation for monitoring the flow of fluid inside each of number of fluid lines 104 while first pressure 148 in interior 130 of pressure vessel 124 is increased. Of course, in some illustrative examples, this operation of monitoring the flow of fluid inside each of number of fluid lines 104 may be performed in addition to operation 908 in FIG. 9.

Figure 10:
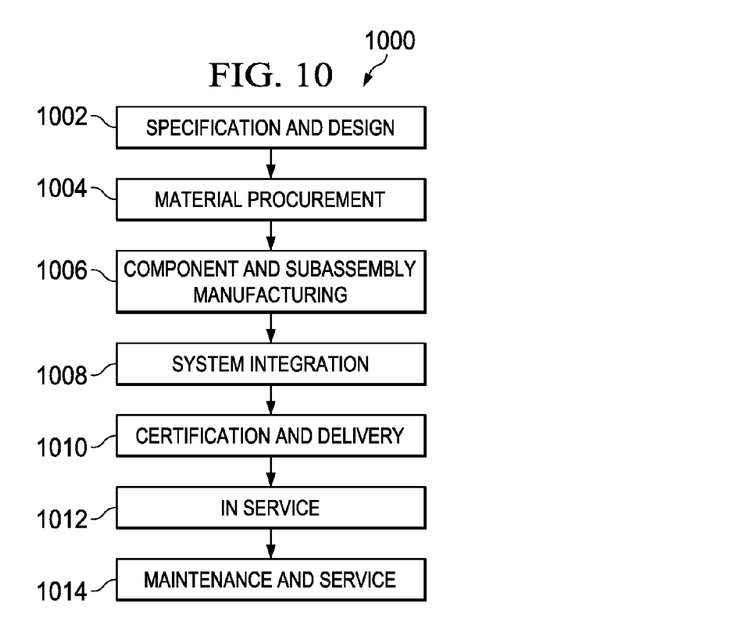
FIG. 10 is an illustration of an aircraft manufacturing and service method in accordance with an advantageous embodiment.
Figure 11:
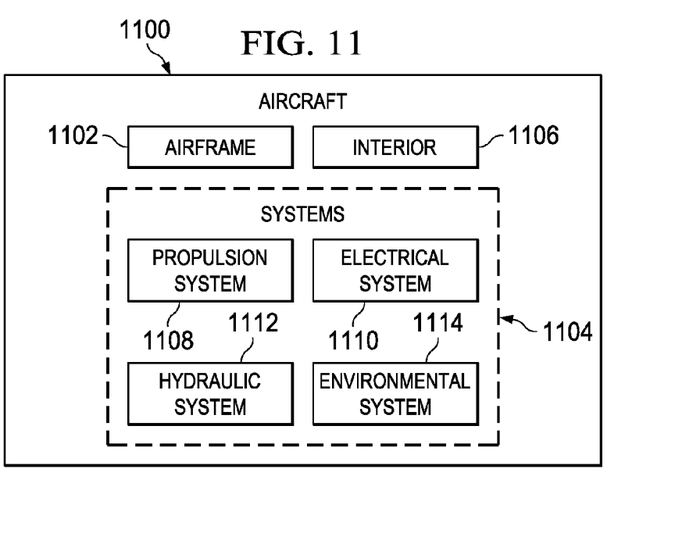
FIG. 11 is an illustration of an aircraft in which an advantageous embodiment may be implemented.

Advantageous embodiments of the present disclosure may be described in the context of aircraft manufacturing and service method 1000 as shown in FIG. 10 and aircraft 1100 as shown in FIG. 11. Turning first to FIG. 10, an illustration of an aircraft manufacturing and service method is depicted in accordance with an advantageous embodiment. During pre-production, aircraft manufacturing and service method 1000 may include specification and design 1002 of aircraft 1100 in FIG. 11 and material procurement 1004.

During production, component and subassembly manufacturing 1006 and system integration 1008 of aircraft 1100 in FIG. 11 may take place. Thereafter, aircraft 1100 may go through certification and delivery 1010 in order to be placed in service 1012. While in service 1012 by a customer, aircraft 1100 may be scheduled for routine maintenance and service 1014, which may include modification, reconfiguration, refurbishment, and other maintenance or service.

Each of the processes of aircraft manufacturing and service method 1000 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 11, an illustration of an aircraft is depicted in which an advantageous embodiment may be implemented. In this example, aircraft 1100 may be produced by aircraft manufacturing and service method 1000 in FIG. 10 and may include airframe 1102 with plurality of systems 1104 and interior 1106. Examples of systems 1104 may include one or more of propulsion system 1108, electrical system 1110, hydraulic system 1112, and environmental system 1114. Any number of other systems may be included.

Testing system 102 in FIG. 1 may be used to test number of fluid lines 104 in FIG. 1 for use with one or more devices and parts for any one of systems 1104, including one or more of propulsion system 1108, electrical system 1110, hydraulic system 1112, environmental system 1114, and other systems. Further, testing system 102 may be used to test number of fluid lines 104 for use in, for example, without limitation, autoclave 112 in FIG. 1, in which autoclave 112 may be used to cure devices and parts for any one of systems 1104.

Still further, testing system 102 may be used to test number of fluid lines 104 during one or more of the stages of aircraft manufacturing and service method 1000 in FIG. 10. For example, without limitation, testing system 102 may be used to test number of fluid lines 104 during component and sub-assembly manufacturing 1006, system integration 1008, routine maintenance and service 1014, and/or other stages in aircraft manufacturing and service method 1000.

In this manner, one or more apparatus embodiments and/or method embodiments for testing number of fluid lines 104 using testing system 102 in FIG. 1 may be utilized during production stages and/or maintenance stages for an aircraft, such as aircraft 1100 in FIG. 11. The use of a number of the different advantageous embodiments may substantially expedite the assembly of and/or reduce the cost of aircraft 1100.

Although an aerospace example is shown, the different advantageous embodiments may be applied to other industries. These other industries may include, for example, without limitation, the automotive industry, display industry, solar cell industry, semiconductor industry, biomedical device industry, biomedical implant industry, sensor industry, and other suitable industries.

Thus, the different advantageous embodiments provide a method and apparatus for testing fluid lines, such as vacuum hoses. In one advantageous embodiment, an apparatus may comprise a pressure vessel, a pressurization system, and a sensor system. The pressurization system may be configured to change a pressure in an interior of the pressure vessel. The sensor system may be configured to monitor a number of characteristics with respect to a fluid line in the pressure vessel while the pressurization system changes the pressure in the interior of the pressure vessel.

In particular, the different advantageous embodiments may provide a method for testing vacuum hoses used in autoclaves that may be less time-consuming and expensive than currently available methods for testing vacuum hoses. Further, the different advantageous embodiments may provide a system that allows multiple vacuum hoses as well as different types of vacuum hoses to be tested at the same time.

The description of the different advantageous embodiments has been presented for purposes of illustration and description and is not intended to be exhaustive or limited to the embodiments in the form disclosed. Many modifications and variations may be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a pressure vessel;
a pressurization system connected to the pressure vessel and configured to change a pressure in an interior of the pressure vessel, the pressurization system comprising a pressure pump configured to pump a fluid into or out of the interior of the pressure vessel such that the pressure in the interior of the pressure vessel changes;
a fluid line in the pressure vessel; and
a sensor system fluidly connected to the fluid line and configured to monitor a number of characteristics with respect to the fluid line and comprising a flow sensor connected to the fluid line and configured to monitor a flow of a fluid in a channel inside the fluid line while the pressurization system changes the pressure in the interior of the pressure vessel;
wherein the number of characteristics includes the flow of the fluid inside the fluid line.

2. The apparatus of claim 1, wherein a change in the pressure in the interior of the pressure vessel is an increase in the pressure.

3. The apparatus of claim 1, wherein the pressure in the interior of the pressure vessel is a first pressure, the number of characteristics includes a second pressure inside the fluid line, and the sensor system comprises:
a pressure gauge connected to the fluid line and configured to monitor the second pressure in a channel inside the fluid line while the pressurization system changes the first pressure in the interior of the pressure vessel.

4. The apparatus of claim 3, wherein the pressure gauge is a first pressure gauge and the sensor system further comprises:
a second pressure gauge connected to the pressure vessel and configured to monitor the first pressure in the interior of the pressure vessel.

5. The apparatus of claim 1 further comprising:
a number of devices connected to the pressure vessel, wherein a device in the number of devices is configured to connect the fluid line to the pressure vessel and another device in the number of devices is configured to seal an end of the fluid line.

6. The apparatus of claim 1 further comprising:
a number of seals configured to seal a number of ends of the pressure vessel such that the interior of the pressure vessel is a closed space in which a seal in the number of seals is selected from one of a cap, a fitting, a bell reducer, a plate, a lid, and a cover.

7. The apparatus of claim 1, wherein the fluid line is a vacuum hose and further comprising:
a vacuum system configured to be connected to the vacuum hose in which the vacuum system is configured to apply a vacuum to a channel inside the fluid line when at least one end of the fluid line is sealed.

8. The apparatus of claim 1, wherein the pressure vessel is selected from one of a pipe, a tube, a chamber, a container, a tank, an enclosed structure, a pressure tank, and a pressure pot.

9. The apparatus of claim 1,
wherein the sensor system comprises: a number of sensors in which a sensor in the number of sensors is configured to monitor the number of characteristics with respect to the fluid line while the pressure in the interior of the pressure vessel is changed; and
wherein a change in a characteristic in the number of characteristics outside of selected tolerances indicates a presence of a leak in the fluid line.

10. The apparatus of claim 1, wherein the fluid line has sealed ends and wherein the sensor system is fluidly connected to the fluid line through one of the sealed ends.

11. A method for testing a fluid line for inconsistencies, the method comprising:
placing the fluid line in an interior of a pressure vessel;
sealing at least one end of the fluid line;
changing a first pressure in the interior of the pressure vessel with the fluid line in the interior of the pressure vessel;
monitoring a number of characteristics with respect to the fluid line by a sensor fluidly connected to the fluid line, wherein the number of characteristics is monitored while the pressure is changed, and wherein monitoring comprises monitoring a second pressure in a channel inside the fluid line while the first pressure is changed; and
identifying a presence of a number of inconsistencies in the fluid line in response to a determination that the second pressure in the channel inside the fluid line changes while the first pressure is changed.

12. The method of claim 11 further comprising:
determining whether the second pressure in the channel inside the fluid line changes while the first pressure in the interior of the pressure vessel changes.

13. The method of claim 11 further comprising:
identifying a level of the first pressure in the interior of the pressure vessel at which the second pressure in the channel inside the fluid line changes.

14. The method of claim 11, wherein the number of characteristics includes a flow of a fluid inside the fluid line and further comprising:
determining whether the flow of the fluid inside the fluid line changes outside of selected tolerances while the first pressure is changed.

15. The method of claim 11, wherein changing the pressure in the interior of the pressure vessel comprises:
pumping a fluid into or out of the interior of the pressure vessel such that the pressure in the interior of the pressure vessel is changed.

16. The method of claim 11 further comprising:
sealing a number of ends of the pressure vessel prior to changing the pressure in the interior of the pressure vessel.

17. An apparatus comprising:
a pressure vessel configured to hold a fluid line;
the fluid line in the interior of the pressure vessel, the fluid line having a first end allowed to vent into an environment outside of the pressure vessel;
a pressurization system connected to the pressure vessel and configured to change a pressure in an interior of the pressure vessel with the fluid line in the interior of the pressure vessel; and
a sensor system configured to monitor the pressure in the interior of the pressure vessel while the fluid line is allowed to vent into an environment outside of the pressure vessel and comprising a flow sensor connected to the fluid line and configured to monitor a flow of a fluid in a channel inside the fluid line while the pressurization system changes the pressure in the interior of the pressure vessel.

18. The apparatus of claim 17, wherein the pressurization system is configured to change the pressure in the interior of the pressure vessel to a selected pressure, wherein an end of the fluid line is opened to allow the fluid line to vent into the environment outside of the pressure vessel when the pressure in the interior of the pressure vessel reaches substantially the selected pressure.

19. A method for testing a fluid line for inconsistencies, the method comprising:
placing the fluid line in an interior of a pressure vessel;
sealing at least one end of the fluid line;
changing a pressure in the interior of the pressure vessel with the fluid line in the interior of the pressure vessel; and
monitoring the pressure in the interior of the pressure vessel while the fluid line is allowed to vent into an environment outside of the pressure vessel.

20. The method of claim 19, wherein changing the pressure in the interior of the pressure vessel with the fluid line in the interior of the pressure vessel comprises:
changing the pressure in the interior of the pressure vessel to a selected pressure with the fluid line in the interior of the pressure vessel; and further comprising:
opening an end of the fluid line to allow the fluid line to vent into the environment outside of the pressure vessel after the pressure in the interior of the pressure vessel reaches substantially the selected pressure.

21. An apparatus comprising:

a pressure vessel;

a pressurization system connected to the pressure vessel and configured to change a pressure in an interior of the pressure vessel, the pressurization system comprising a pressure pump configured to pump a fluid into or out of the interior of the pressure vessel such that the pressure in the interior of the pressure vessel changes;

a fluid line in the pressure vessel, the fluid line having a first end allowed to vent into an environment outside of the pressure vessel;

a device connected to a second end of the fluid line, the device configured to seal the second end of the fluid line; and a sensor system configured to monitor a number of characteristics with respect to the pressure vessel and comprising a flow sensor connected to the fluid line and configured to monitor a flow of a fluid in a channel inside the fluid line while the pressurization system changes the pressure in the interior of the pressure vessel;

wherein the number of characteristics includes the flow of the fluid inside the fluid line.

* * * * *